(12) United States Patent
Murasawa

(10) Patent No.: US 8,876,199 B2
(45) Date of Patent: Nov. 4, 2014

(54) SUNSHADE APPARATUS

(71) Applicant: Yachiyo Industry Co., Ltd., Sayama (JP)

(72) Inventor: Akira Murasawa, Sakura (JP)

(73) Assignee: Yachiyo Industry Co., Ltd., Sayama-Shi (JP)

( * ) Notice: Subject to any disclaimer, the term of this patent is extended or adjusted under 35 U.S.C. 154(b) by 0 days.

(21) Appl. No.: 13/963,254

(22) Filed: Aug. 9, 2013

(65) Prior Publication Data

US 2014/0042777 A1 Feb. 13, 2014

(30) Foreign Application Priority Data

Aug. 10, 2012 (JP) ................. 2012-177669

(51) Int. Cl.
| | |
|---|---|
| *B60J 3/06* | (2006.01) |
| *B60J 7/043* | (2006.01) |
| *B60J 7/00* | (2006.01) |

(52) U.S. Cl.
CPC .. *B60J 7/003* (2013.01); *B60J 3/06* (2013.01); *B60J 7/043* (2013.01)
USPC ........... 296/211; 296/214; 160/370.21; 74/89

(58) Field of Classification Search
CPC ............. B60J 3/06; B60J 7/0007; B60J 7/003
USPC ................... 296/211, 214; 160/370.21; 74/89
See application file for complete search history.

(56) References Cited

U.S. PATENT DOCUMENTS

| | | | | |
|---|---|---|---|---|
| 4,852,938 | A * | 8/1989 | Hirshberg et al. | 296/214 |
| 5,149,170 | A * | 9/1992 | Matsubara et al. | 296/213 |
| 5,816,647 | A * | 10/1998 | Farmont | 296/220.01 |
| 6,012,767 | A * | 1/2000 | Farmont | 296/214 |
| 6,520,569 | B2 * | 2/2003 | Wingen et al. | 296/214 |
| 8,382,200 | B2 * | 2/2013 | Mathes et al. | 296/211 |
| 2003/0146650 | A1 * | 8/2003 | Paul et al. | 296/214 |

FOREIGN PATENT DOCUMENTS

JP 57-150013 3/1956

* cited by examiner

*Primary Examiner* — Dennis H Pedder
(74) *Attorney, Agent, or Firm* — Rankin, Hill & Clark LLP

(57) ABSTRACT

Provided is a sunshade apparatus disposed under a sunroof panel installed in a fixed roof of a vehicle, comprising a frame having a plurality of frame openings arranged in a width direction of the vehicle, and a plurality of polarizing panel sets each of which is disposed correspondingly to one of the frame openings. The frame is formed to be higher in the middle portion thereof than both end portions thereof in the width direction so as to follow the shape of the fixed roof, and each polarizing panel set inclines to be higher as approaching the middle portion of the vehicle in the width direction.

2 Claims, 4 Drawing Sheets

SUNSHADE APPARATUS

CROSS REFERENCE TO RELATED APPLICATIONS

This application claims the foreign priority benefit under Title 35, United States Code, 119 (a)-(d) of Japanese Patent Application No. 2012-177669 which is filed on Aug. 10, 2012 in the Japan Patent Office, the disclosure of which is herein incorporated by reference in its entirety.

BACKGROUND OF THE INVENTION

1. Technical Field

The present invention relates to a sunshade apparatus for a vehicle.

2. Description of Background Art

For example, the patent document 1 discloses a technology to adjust the sunshine quantity to take in an interior of a vehicle by using two polarizing panels one of which is positioned under the other. The adjustment of the sunshine quantity can be done by rotating one of the two polarizing panels.

For example, a feeling of release and the freedom of the adjustment of the sunshine quantity to take in the interior of the vehicle can be improved by disposing a sunshade apparatus having the polarizing panels under a sunroof panel equipped in the fixed roof of the vehicle.

Patent document 1: Japanese Utility Model Laid-Open Publication No. 57-150013

BRIEF SUMMARY OF THE INVENTION

In general, the fixed roof of the vehicle has a curved form so as to become higher as approaching the middle portion from each of the left and the right end portions thereof in the width direction of the vehicle in order to have a head clearance of the interior of the vehicle large. However, the prior polarizing panels prevent the head clearance from enlarging because the prior polarizing panels are horizontally disposed.

At least the preferred embodiments of the present invention seek to solve such a problem. It is an object of at least the preferred embodiments of the present invention to provide a sunshade apparatus having a function of adjusting the sunshine quantity and being capable of enlarging a head clearance in the interior of the vehicle.

The present invention provides a sunshade apparatus disposed under a sunroof panel equipped in a fixed roof of a vehicle, comprising:

a frame having a plurality of frame openings arranged in a width direction of the vehicle; and a plurality of polarizing panel sets each of which is disposed correspondingly to one of the frame openings, wherein the frame is formed to be higher in the middle portion thereof than both end portions thereof in the width direction so as to follow the shape of the fixed roof, and each polarizing panel set inclines to be higher as approaching the middle portion of the vehicle in the width direction.

According to the above sunshade apparatus, the adjustment of the sunshine quantity to take in the interior of the vehicle can be done by using the polarizing panel sets. And a head clearance is enlarged, because the fixed roof and each polarizing panel set become higher as approaching the middle portion in the width direction of the vehicle.

And, it is preferable that the sunshade apparatus further comprises a pair of guide rails extending in a front-rear direction on both sides in the width direction of the fixed roof, wherein the frame can move along the pair of guide rails, and each end portion of the frame in the width direction has a shoe to slide within the corresponding guide rail.

According to the above sunshade apparatus, the frame with the polarizing panel sets can be drawn to under the sunroof panel when the adjustment of the sunshine quantity is needed, and the frame with the polarizing panel sets can be retreated from under the sunroof panel when the adjustment of the sunshine quantity is not needed.

Furthermore, it is preferable that each polarizing panel set is constructed by positioning a lower polarizing panel under an upper polarizing panel, and at least one of the upper polarizing panel and the lower polarizing panel of each polarizing panel set has a panel body and a projecting portion projecting outward from the panel body, wherein a slider to move along a straight line is disposed in the frame, wherein the slider is connected with the projecting portion, and wherein the sunshade apparatus further comprises a converting mechanism to convert the linear movement of the slider into the rotary movement of one of the upper polarizing panel and the lower polarizing panel.

According to the above sunshade apparatus, there can be provided a simple mechanism for adjusting of the sunshine quantity.

As apparent from the above explanation, the sunshade apparatus according to the present invention has a function of adjusting the sunshine quantity, and can enlarge a head clearance in the interior of the vehicle.

BRIEF DESCRIPTION OF THE SEVERAL VIEWS OF THE DRAWING

Certain preferred embodiments of the present invention will now be described in greater detail by way of example only and will reference to the accompanying drawings, in which.

DETAILED DESCRIPTION OF THE INVENTION

Figure 1:
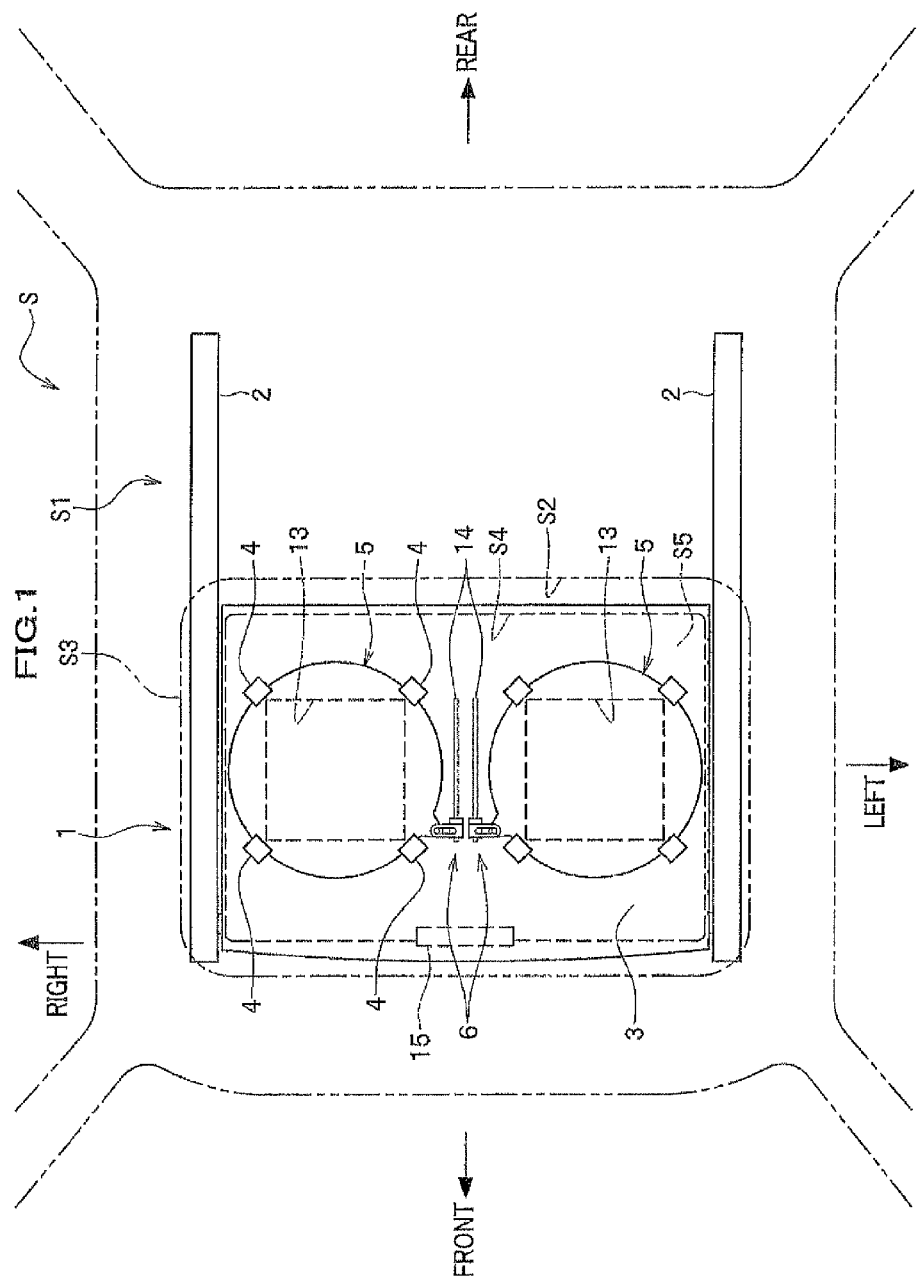
FIG. 1 is a plan view of a sunshade apparatus according to the present embodiment.

An embodiment of a sunshade apparatus 1 according to the present invention will be described in detail with reference to the attached drawings. Regarding directions, the front side for a driver in a vehicle is "front", the rear side is "rear", the right side is "right", and the left side is "left", in this specification. The sunshade apparatus 1 of the present embodiment is an apparatus to be installed in the fixed roof S1 of the vehicle S. And the sunshade apparatus 1 can take the sunshine in the interior of the vehicle and can shield it. Furthermore, the sunshade apparatus 1 can also adjust the sunshine quantity to take in the interior of the vehicle. In FIG. 1, the sunshade apparatus 1 is shown with solid line, and the other is shown with two dot-chain line.

Figure 3:
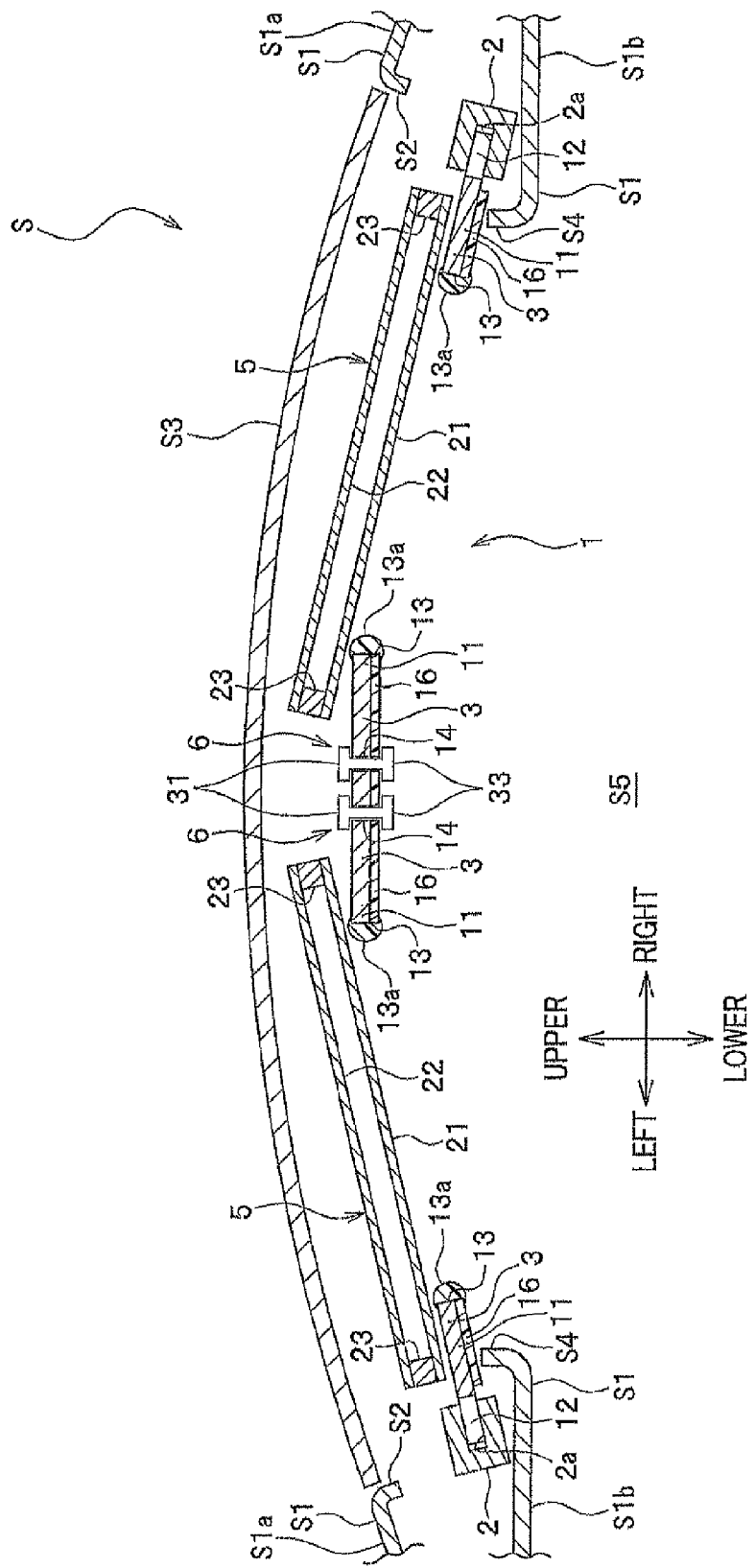
FIG. 3 is a sectional end view taken along the line I-I shown in FIG. 2.

The fixed roof S1 has an outer roof S1a forming the outer panel of the vehicle S and an inner roof S1b forming the ceiling board of the interior S5 as shown in FIG. 3. The outer roof S1a has an outer opening S2, and the sunroof panel S3 is installed in the outer opening S2. The outer opening S2 is formed substantially in a rectangular shape with rounded corners in plan view at the front area of the outer roof S1a, and vertically passes through the outer roof S1a. The sunroof panel S3 has substantially the same shape in plan view as the outer opening S2, and is disposed in the outer opening S2. The sunroof panel S3 is made of, for example, a transparent glass panel.

An inner opening S4 is formed in the inner roof S1b and communicates with the outer opening S2 as shown in FIGS. 1 and 3. Hereby, a person in the vehicle S can view the outside from the inside S5 through the inner and the outer openings. And the outer opening S2 is slightly larger than the inner opening S4.

The sunroof panel S3 is curved to become gradually higher as approaching the middle portion thereof from both end portions thereof in the width direction of the vehicle as shown in FIG. 3. And the outer roof S1a and the inner roof S1b are also curved substantially at the same curvature as the sunroof panel S3. Furthermore, the sunroof panel S3 of the present embodiment can slide relatively to the fixed roof S1 in the front-rear direction, but may be fixed to the fixed roof S1. The slider mechanism for the sunroof panel S3 is the same as a publicly-known art, so the detailed explanation thereof is omitted.

Figure 2:
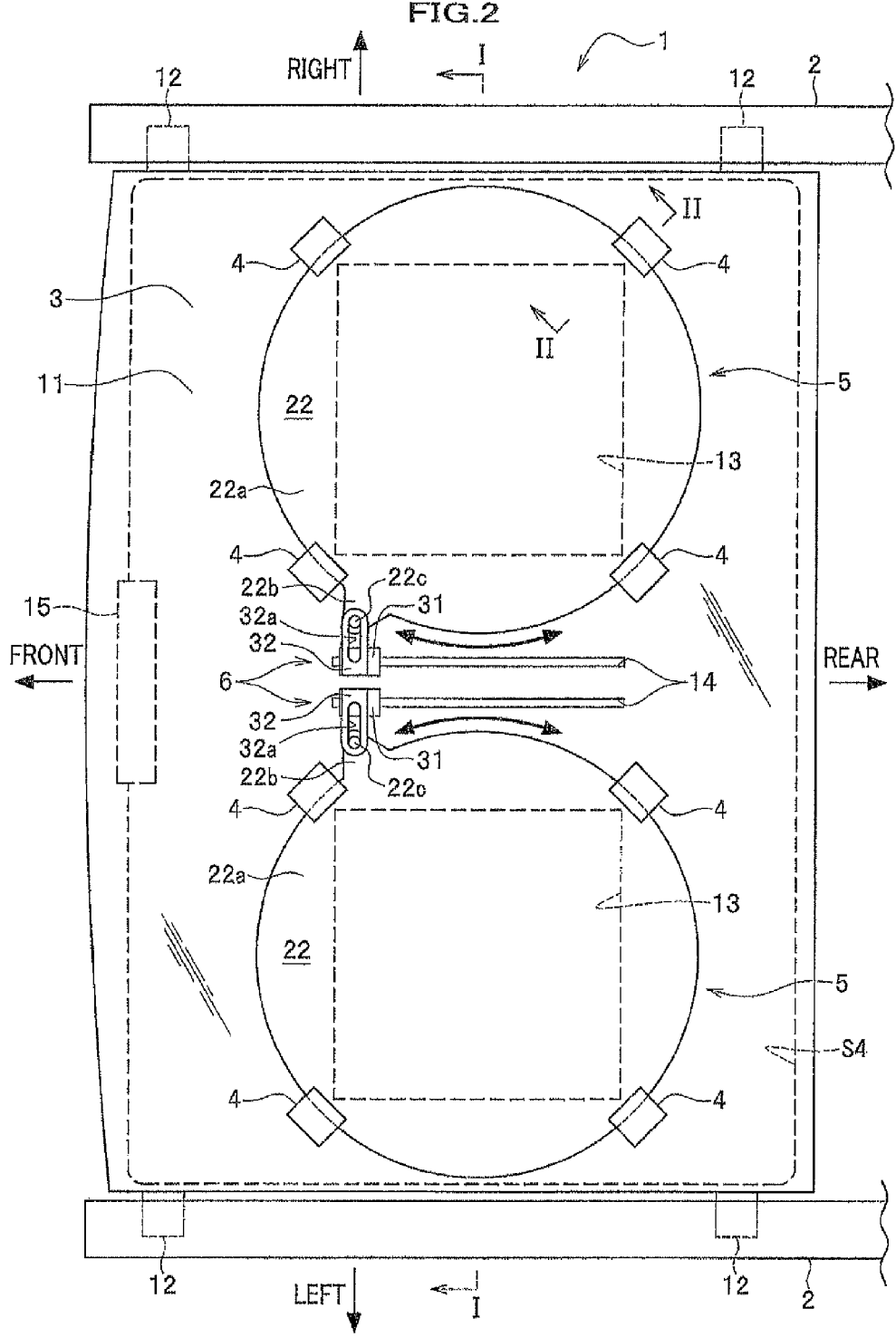
FIG. 2 is a partial enlarged plan view of the sunshade apparatus shown in FIG. 1.

The sunshade apparatus 1 of the present embodiment comprises a pair of guide rails 2, a frame 3, holders 4, two polarizing panel sets 5, and two slider units 6 as shown in FIGS. 1 and 2.

One guide rail 2 is disposed on the left side of the fixed roof S1 and the other is disposed on the right side, and each extends in the front-rear direction as shown in FIG. 1. The inner opening S4 is positioned between the pair of guide rails 2. Each guide rail 2 is made of an extruded metal member, and the frame 3 is guided by the guide rails 2 when the frame 2 moves. Each guide rail 2 is shown by itself in FIG. 3, but, actually, each guide rail 2 is fixed to the inner roof S1b and/or the outer roof S1a. The pair of guide rails 2 are fixed so that two opening ports of two grooves 2a of the pair of guide rails 2 substantially face to each other, and each groove 2a opens to an upper slant, as shown in FIG. 3.

The frame 3 made of a metal plate has an almost rectangular shape in plan view as shown in FIG. 2, and is a base member to support the two polarizing panel sets 5 and the two slider units 6. The frame 3 includes a main body 11, four shoes 12 formed at or attached to both ends of the frame in the left-right direction (in the width direction), two frame openings 13, two slits 14, and a grip 15.

The main body 11 is formed to be higher in the middle portion thereof than both end portions thereof in the width direction of the vehicle so as to follow the sectional shape of the sunroof panel S3 as shown in FIG. 3. The four shoes 12 are formed at or attached to a front portion and a rear portion of each of the left and the right end sides of the main body 11, respectively. Each shoe 12 can slide within a groove 2a formed in the corresponding guide rail 2.

The frame openings 13 are formed in the left and the right sides of the main body 11 passing vertically through the main body as shown in FIG. 2. Each frame opening 13 of the present embodiment has a rectangular shape in plan view, but may have another shape. A trim 13a is attached to the main body 11 along an inner edge defining each frame opening 13 as shown in FIG. 3. The trim 13a is made of a soft material like rubber to protect the inner edge of the main body 11.

The two slits 14 are formed between the two frame openings 13. Each slit 14 extends in the front-rear direction and passes vertically through the main body 11.

The grip 15 is a recessed portion formed on the lower surface of the main body 11. And the grip 15 is a grip to be gripped from the inside S5 by a person in the vehicle. A lower surface of the frame 3 exposed to the inside S5 is covered with a cover sheet 16 as shown in FIG. 3.

The holders 4, two polarizing panel sets 5 and two slider units 6 are arranged symmetrically in the left-right direction in the sunshade apparatus 1. Therefore, the right side structure will be mainly explained in the following, and the explanation of the left side structure will be omitted. And the same symbol is used for the corresponding parts of the left side structure and the right side structure.

Figure 4:
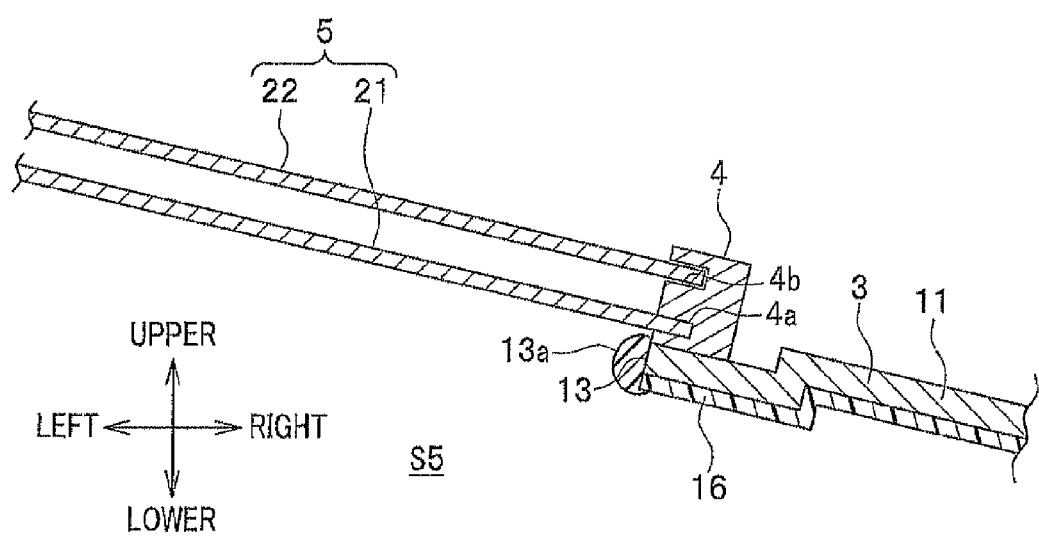
FIG. 4 is an enlarged sectional end view taken along the line II-II shown in FIG. 2.

The holders 4 are disposed near four corners of the frame opening 13, respectively, as shown in FIG. 2. The four holders 4 hold each polarizing panel set 5. Each holder 4 is fixed on the upper surface of the main body 11 of the frame 3 as shown in FIG. 4. And each holder 4 is fixed so that the direction of each of grooves 4a and 4b pointing to the opening port of the groove from the bottom of the groove is substantially the same as an inclination of the polarizing panel set 5 as shown in FIG. 4. The grooves 4a and 4b will be explained later.

The polarizing panel sets 5 are disposed at the frame openings 13, respectively, and each polarizing panel 5 covers fully over the corresponding frame opening 13 as shown in FIG. 2. Each polarizing panel set 5 includes a lower polarizing panel 21, an upper polarizing panel 22 and a seal member 23 as shown in FIG. 3. The lower polarizing panel 21 and the upper polarizing panel 22 are panels whose polarization directions are different from each other. Adjusting the sunshine quantity can be done by rotating one of the lower polarizing panel 21 and the upper polarizing panel 22. In the present embodiment, the upper polarizing panel 22 is rotated to adjust the sunshine quantity. And in the present embodiment, each polarizing panel set 5 is installed so as to incline to be higher as approaching the middle portion of the sunroof panel S3, the frame 3 or the fixed roof S1 in the width direction of the vehicle.

The lower polarizing panel 21 is disposed under the upper polarizing panel 22 as shown in FIG. 3. And the lower polarizing panel 21 has a circle shape in plan view, and is fixed in the groove 4a of the holder 4 as shown in FIG. 4.

The upper polarizing panel 22 is positioned over the lower polarizing panel 21, and has an approximate circular shape as shown in FIG. 2. The upper polarizing panel 22 has a panel body 22a, a projecting portion 22b and a pin 22c standing on the projecting portion 22b. The projecting portion 22b projects roughly in a radius direction of the panel body 22a from the panel body 22a to the outside. In other words, the projecting portion 22b projects substantially to the left of the vehicle (or to the right of the vehicle). The upper polarizing panel 22 is inserted in the groove 4b of the holder 4 so that the upper polarizing panel 22 can rotate as shown in FIG. 4. And the projecting portion 22b can reciprocate between two nearest holders 4 as shown in FIG. 2.

The seal 23 is disposed between the lower polarizing panel 21 and the upper polarizing panel 22. And the seal 23 is disposed along the entire circumferences of the lower and the upper polarizing panels 21 and 22 except portions corresponding to the holders 4. The seal 23 prevents dust or the like from entering the space between the upper and the lower polarizing panels 21 and 22, so that the polarizing panel set 5 can be prevented from being deteriorated.

The slider unit 6 has a slider 31, a connecting portion 32 and a knob portion 33 as shown in FIGS. 2 and 3. The slider 31 can move along the slit 14. The connecting portion 32 is formed integrally with the slider 31, and extends in the left-right direction. And a long hole 32a prolonged in the left-right direction is formed in the connecting portion 32. The knob portion 33 is formed integrally with the slider 31, and appears in the inside S5 as shown in FIG. 3.

The pin 22c of the upper polarizing panel 22 is inserted in the long hole 32a of the connecting portion 32, and can move within the long hole 32a. The converting mechanism according to the present invention is a mechanism to convert a linear movement of the slider unit 6 to a rotary movement of the lower polarizing panel 21 or the upper polarizing panel 22. In the present embodiment, the converting mechanism converts the linear movement of the slider unit 6 to the rotary movement of the upper polarizing panel 22. The converting mechanism of the present embodiment has a combination of the projecting portion 22b and the pin 22c; and the connecting portion 32 and the long hole 32a. The converting mechanism is not limited to the above-said one. For example, the long hole may be formed in the projecting portion, and the pin may be formed on the connecting portion. Furthermore, other constitutions may be allowable.

And then, operation of the sunshade apparatus 1 will be explained. A person in the interior S5 moves the frame 3 toward the front while having the grip 15 with his or her hand, so that the frame 3 is positioned under the sunroof panel S3. In this state, the sunshade apparatus 1 can be utilized. When the sunshade apparatus 1 is not utilized, the frame 3 may be moved toward the rear so that the frame 3 is put away in the space between the outer roof S1a and the inner roof S1b.

When the frame 3 of the sunshade apparatus 1 is positioned under the sunroof panel S3 and the person does not want to take the sunshine in the interior S5, the person moves the slider 31 up to the front end of the slit 14 while having the knob portion 33 with his or her hand. Hereby, the upper polarizing panel 22 rotates in one rotational direction, so that the interior S5 can be shaded from the sunshine.

When the person wants to take the sunshine in the interior S5, the person moves the slider 31 toward the rear end of the slit 14 while having the knob portion 33 with his or her hand. Hereby, the upper polarizing panel 22 rotates in the other rotational direction, so that the sunshine quantity to take in the interior S5 can be increased as the slider 31 with the knob portion 33 moves toward the rear end of the slit 14. When the slider 31 with the knob portion 33 reaches the rear end of the slit 14, the person can clearly view the sky above the vehicle S from the interior S5.

According to the sunshade apparatus 1 of the present embodiment described in the above, adjusting the sunshine quantity to take in the interior S5 can be done by equipping with the polarizing panel sets 5. And the head clearance can be enlarged because the frame 3 and the polarizing panel sets 5 are formed or arranged to be higher so as to follow the shapes of the sunroof panel S3 and the fixed roof S1 as approaching the middle portion of the vehicle in the width direction of the vehicle.

And then, according to the present embodiment, by equipping with the guide rails 2 and the shoes 12, the frame 3 can be positioned under the sunroof panel S3 when adjusting of the sunshine quantity is needed, and the frame 3 can be retreated from under the sunroof panel S3 when adjusting of the sunshine quantity is not needed. Hereby, a feeling of release in the interior S5 can be improved with the simple operation.

Furthermore, the linear movement of the slider unit 6 can be converted to the rotary movement of the upper polarizing panel 22 by the converting mechanism of the combination of the projecting portion 22b and the pin 22c; and the connecting portion 32 and the long hole 32a.

The present embodiment according to the present invention has been described in the above. However, the present invention is not limited to the present embodiment, and may be modified properly within the scope of the present invention. For example, the frame 3 can be moved in the front-rear direction in the present embodiment, but may be fixed not to be moved.

Furthermore, the upper polarizing panel 22 is formed to be able to rotate in the present embodiment, but the lower polarizing panel 21 may be formed to be able to rotate. And furthermore, the slider 31 may be formed to be able to be moved by an electric drive like an electric motor with an operation for switches or the like in the interior S5 by the person.

And two frame openings 13 are arranged in the width direction of the vehicle is described in the present embodiment, but three or more frame openings 13 may be arranged. In a case where the number of frame openings 13 is an odd number, the middle polarizing panel set 5 should be set horizontally, and the others 5 are set to be inclined. Furthermore, the two polarizing panel sets 5 can be separately adjusted in the present embodiment when the sunshine quantity is adjusted. However, the two polarizing panel sets 5 may be synchronously adjusted, for example, by making the two slider units 6 into an integrated slider unit. And furthermore, the two slider units 6 are positioned in the middle portion of the frame 3 in the width direction of the frame 3 in the present embodiment. However, the two slider units 6 may be positioned at other positions. And the polarizing panel set 5 one polarizing panel of which is rotatable is exemplified in the present embodiment, but another type of polarizing panel set one polarizing panel of which is linearly moved may be adopted.

DESCRIPTION OF REFERENCE SYMBOLS

1 Sunshade apparatus
2 Guide rail
3 Frame
4 Holder
5 Polarizing panel set
6 Slider unit
11 Main body
12 Shoe
13 Frame Opening
14 Slit
21 Lower polarizing panel
22 Upper polarizing panel
22a Panel body
22b Projecting portion
22c Pin
23 Seal
31 Slider
32 Connecting portion
33 Knob portion
S Vehicle
S1 Fixed roof
S1a Outer roof
S1b Inner roof
S2 Cuter opening
S3 Sunroof panel
S4 Inner opening
S5 Interior (of vehicle)

What is claimed is:
1. A sunshade apparatus disposed under a sunroof panel equipped in a fixed roof of a vehicle, comprising:
a frame having a plurality of frame openings arranged in a width direction of the vehicle; and
a plurality of polarizing panel sets each of which is disposed correspondingly to one of the frame openings, wherein the frame is formed to be higher in the middle portion thereof than both end portions thereof in the width direction so as to follow the shape of the fixed roof, and each polarizing panel set inclines to be higher as approaching the middle portion of the vehicle in the width direction, wherein each polarizing panel set is constructed by positioning a lower polarizing panel under an upper polarizing panel, and at least one of the upper polarizing panel and the lower polarizing panel of each polarizing panel set has a panel body and a protecting portion protecting outward from the panel body, wherein a slider to move along a straight line is disposed in the frame, wherein the slider is connected with the projecting portion, and wherein the sunshade apparatus further comprises a converting mechanism to convert the linear movement of the slider into the rotary movement of one of the upper polarizing panel and the lower polarizing panel.

2. The sunshade apparatus according to claim 1, further comprising a pair of guide rails extending in a front-rear direction on both sides in the width direction of the fixed roof, wherein the frame can move along the pair of guide rails, and each end portion of the frame in the width direction has a shoe to slide within the corresponding guide rail.

\* \* \* \* \*